United States Patent
Wang et al.

(10) Patent No.: US 11,657,708 B2
(45) Date of Patent: May 23, 2023

(54) LARGE-SCALE REAL-TIME TRAFFIC FLOW PREDICTION METHOD BASED ON FUZZY LOGIC AND DEEP LSTM

(71) Applicant: Harbin Engineering University, Heilongjiang (CN)

(72) Inventors: Tong Wang, Heilongjiang (CN); Azhar Hussain, Heilongjiang (CN); Shan Gao, Heilongjiang (CN); Jiahua Cao, Heilongjiang (CN); Liwei Chen, Heilongjiang (CN)

(73) Assignee: Harbin Engineering University, Heilongjiang (CN)

( * ) Notice: Subject to any disclaimer, the term of this patent is extended or adjusted under 35 U.S.C. 154(b) by 155 days.

(21) Appl. No.: 17/211,734

(22) Filed: Mar. 24, 2021

(65) Prior Publication Data

US 2021/0209939 A1    Jul. 8, 2021

(30) Foreign Application Priority Data

Dec. 8, 2020   (CN) .......................... 202011425721.9

(51) Int. Cl.
  *G08G 1/01*   (2006.01)
  *G06T 7/90*   (2017.01)
  *G06T 7/20*   (2017.01)

(52) U.S. Cl.
  CPC ............ *G08G 1/0133* (2013.01); *G06T 7/20* (2013.01); *G06T 7/90* (2017.01);
  (Continued)

(58) Field of Classification Search
  CPC .. G08G 1/0133; G08G 1/0129; G08G 1/0141; G08G 1/012; G08G 1/0125;
  (Continued)

(56) References Cited

U.S. PATENT DOCUMENTS

2020/0387887 A1* 12/2020 Rathod .............. G06Q 20/3224
2022/0058944 A1*  2/2022 Jha ........................ G08G 1/0141

FOREIGN PATENT DOCUMENTS

WO    WO 2016/033969    *  3/2016

OTHER PUBLICATIONS

Jiang et al., "Deep Learning for Short-term Traffic Conditions Prediction", 2020 International Conference on Service Science (ICSS), Aug. 24-26, 2020 (Year: 2020).*

* cited by examiner

*Primary Examiner* — Qian Yang

(57) ABSTRACT

A large-scale real-time traffic flow prediction method of the present invention is based on fuzzy logic and deep LSTM, which relates to a technical field of urban intelligent traffic management. The method includes steps of: selecting an urban road network scene to collect color images of real-time traffic flow congestion information; obtaining congestion levels of multiple intersections according to the color images, which are used in a data training set; and forming a data sensing end of FDFP through a fuzzy mechanism; establishing a deep LSTM neural network, performing deep learning on the training data set, and constructing a prediction end of the FDFP; construct a graph of road intersections and formulate a k-nearest neighbors-based discounted averaging for obtaining congestion on the edges; and inputting real-time traffic information received from a server into an FDFP model.

5 Claims, 2 Drawing Sheets

(52) U.S. Cl.
CPC ........... *G06T 2207/10024* (2013.01); *G06T 2207/20081* (2013.01); *G06T 2207/20084* (2013.01); *G06T 2207/30236* (2013.01)

(58) Field of Classification Search
CPC .......... G08G 1/0137; G06T 7/20; G06T 7/90; G06T 2207/10024; G06T 2207/20081; G06T 2207/20084; G06T 2207/30236; G06N 3/0436; G06N 3/0445; G06N 3/08; G06N 3/0454; G06Q 10/04; G06K 9/6256
See application file for complete search history.

LARGE-SCALE REAL-TIME TRAFFIC FLOW PREDICTION METHOD BASED ON FUZZY LOGIC AND DEEP LSTM

CROSS REFERENCE OF RELATED APPLICATION

The present invention claims priority under 35 U.S.C. 119(a-d) to CN 202011425721.9, filed Dec. 8, 2020.

BACKGROUND OF THE PRESENT INVENTION

Field of Invention

The present invention relates to a technical field of urban intelligent traffic management, particularly to a large-scale real-time traffic flow prediction method based on fuzzy logic and deep LSTM.

Description of Related Arts

With the acceleration of urbanization, intelligent traffic control technology has been widely used in practical projects such as proper urban road traffic planning, efficient deployment of traffic lights, and residents' travel planning, which helps to establish intelligent, dynamic and informalized ITS (Intelligent Transportation Systems) for smart traffic control. The core of such technology is the dynamic analysis and forecast of short-term traffic flow. The accurate prediction of real-time traffic flow provides great convenience for traffic management and guidance, which can be combined with the reasonable deployment of traffic lights to maximize highly-efficient, convenient and rapid practical effects of the intelligent transportation system, intelligently select optimal routes, avoid traffic congestion, improve users' travel comfort, minimize the pressure on the traffic environment, and allocate road resources reasonably.

The commonly used traffic flow prediction methods can be divided into two categories: 1) parametric method and 2) non-parametric method. The most frequently used parameter method is the autoregressive integral moving average model (ARIMA), which can solve some traffic flow problems with little randomness within a specific range. Still, it cannot reflect the nonlinearity and random traffic flow volatility. As a result, it is not applicable for highly dynamic urban traffic. Recent research based on non-parametric methods has become the main focus of ITS due to its randomness and nonlinear characteristics. Such research includes random forest methods, support vector regression (SVR) technology, Bayesian networks, etc. Besides, artificial neural networks (ANN) and their combined models also show good traffic prediction effects, such as deep belief networks. However, the above methods' model accuracy relies on massive traffic data, and most of the traffic data are usually private, which limits the application of the model. Most current traffic flow prediction algorithms are weak in designing a set of urban road traffic detection mechanisms, realizing the acquisition of road traffic information according to the algorithm requirements, and then carrying out model training.

SUMMARY OF THE PRESENT INVENTION

The present invention aims at the traffic flow prediction problem that the number of available data sets is limited and the area selection is limited. The different architecture designs and parameter selection have other effects on LSTM neural network training. Therefore, the present invention proposes a Fuzzy logic and Deep learning based Flow Prediction FDFP model that takes into account the high dynamics, randomness, and instability of urban traffic, builds a training set based on fuzzy logic, and builds and trains a deep LSTM neural network, to realize real-time detection of urban traffic congestion level and flow prediction. Accordingly, the present invention provides:

a large-scale real-time traffic flow prediction method based on fuzzy logic and deep LSTM (long short-term memory), comprising steps of:

1) selecting an urban road network scene to collect color images of real-time traffic flow congestion information;

2) obtaining congestion levels of multiple intersections according to the color images, which are used in a data training set; and forming a data sensing end of FDFP through a fuzzy mechanism;

3) establishing a deep LSTM neural network, performing deep learning on the data training set, and constructing a prediction end of the FDFP;

4) inputting real-time traffic information obtained from a server into an FDFP model to real-time obtain traffic prediction for the multiple intersections within a future time range and evaluating actual real-time traffic conditions of each of the intersections on prediction effects of different models; and 5) obtaining estimated congestion levels at roads by using a novel discounted averaging formula and generating a weighted graph of city-level road network for optimal travel time route guidance of vehicles.

Preferably, the step 1) comprises specific steps of:

1.1) selecting an area, and obtaining dynamic real-time traffic information of the region through map websites comprising Google® Maps, Baidu® Maps, Trafficview®, and INRIX®;

1.2) proposing a recording mechanism for traffic information in the area according to time and space and constructing a periodically updated data set; and 1.3) sampling periodically updated traffic information images twice a minute to capture colored congestion images, each represented as $T_T(t)$.

Preferably, the step 2) comprises specific steps of:

2.1) converting a color mode of captured color congestion images from RGB to HSV;

2.2) according to a mapping relationship from latitude and longitude information of the intersections to image pixel information, adopting a range factor $\alpha$, which obeys Gaussian distribution, to delimit ranges of the intersections in the images, whereas capture ranges of the intersections are expressed as:

$$I_p(n) = I_T(t)[y_p(n) - \alpha \cdot y_p(n) + \alpha, x_p(n) - \alpha \cdot x_p(n) + \alpha]$$

whereas $I_p(n)$ is a capture range of an n-th intersection, $(x_p(n), y_p(n))$ is coordinate information of the n-th intersection, p is pixel information, and $\alpha$ is the range factor which obeys the Gaussian distribution;

2.3) dividing image information of the intersections into four levels: green, yellow, red, and dark red, thereby representing vehicle speed information on road sections, and indirectly reflecting the congestion levels of the road sections;

2.4) designing a fuzzy system, and selecting membership function ranges and shapes of each description object, to distinguish congestion level dividing results corresponding to the road sections with different colors;

2.5) using pixel levels $I_G$, $I_Y$, $I_R$, $I_{DR}$, which correspond to the four colors in each intersection image after threshold processing, as an input of the fuzzy system; dividing seven linguistic variables for each input of the fuzzy system to represent seven congestion levels from non-congestion to severe congestion; and using a fuzzy rule set in combination with a defuzzifier to generate a crisp output;

2.6) recording the obtained congestion level information ranging from 0 to 1 corresponding to each time period and intersection location information in a constructed training set;

2.7) obtaining the training data set containing all intersection locations, intersection IDs, congestion information and specific times, wherein the training data set is updated every 30 seconds; and 2.8) constructing the training data set with traffic congestion information of the selected area for two months to obtain the data sensing end of the FDFP.

Preferably, the step 3) comprises specific steps of:

selecting parameters of each layer of the LSTM neural network; determining a network layer quantity, a neuron quantity in each layer, and an optimization algorithm of a training process; adopting a five-layer LSTM multi-hidden-layer network structure, wherein each layer contains 200 neurons; training an LSTM neural network according to the training data set, and saving an obtained deep LSTM neural network model.

Preferably, the step 4) comprises specific steps of:

4.1) inputting periodically updated data into the FDFP model to obtain output prediction data;

4.2) determining a mean square error of a network training loss function, which is expressed as:

$$MSE(y, \hat{y}) = \frac{1}{T_{samples}} \sum_{t=0}^{T_{samples}-1} (y_t(n) - \hat{y}_t(n))^2$$

whereas $\hat{y}_t(n)$ is actual future time data, $T_{samples}$ is a training window length, and $y_t(n)$ is a model prediction result;

4.3) selecting actual data set for test according to different parameters, so as to determine parameters for the FDFP model, wherein an optimization objective is to minimize a loss function; using an Adam optimization algorithm for gradient calculation, thereby continuously adjusting a model weight and reducing the prediction error of network using iterative update; and 4.4) during prediction, minimizing a mean absolute percentage error MAPE and a mean absolute error MAE to maximize prediction accuracy, wherein the mean absolute percentage error and the mean absolute error are expressed as:

$$MAPE(y, \hat{y}) = \frac{1}{T_{samples}} \sum_{t=0}^{T_{samples}} \frac{|y_t(n) - \hat{y}_t(n)|}{y_t(n)}$$

$$MAE(y, \hat{y}) = \frac{1}{T_{samples}} \sum_{t=0}^{T_{samples}-1} |y_t(n) - \hat{y}_t(n)|$$

wherein $\hat{y}_t(n)$ is actual data at an actual future time t, $T_{samples}$ is the training window length, and $y_t(n)$ is the model prediction result;

Preferably, the step 5) comprises specific steps of:

5.1) inputting periodically updated predictions from the LSTM neural network to obtain congestion based graph G(N,E) of the city road network, where N, represents a set of intersections $\{n_i, n_j, \ldots\}$ and E represents a set of edges;

5.2) obtaining all Euclidean distances for the graph, and then normalizing the Euclidean distances in range (0,1], so that $|d_{ij}|$ is a normalized distance between an intersection $n_i$ and $n_j$ for an edge $e_{ij}$; 5.3) obtaining estimated congestion of k-nearest neighbors $K_i$ of every intersection $n_i$ in the graph as:

$$\hat{y}_t(K_i) = \frac{1}{K_i} \sum_{k \in K_i} \hat{y}_t(n_k);$$

and 5.4) obtaining estimated congestion of every edge $e_{ij}$ in the graph as:

$$\hat{y}_t(e_{ij}) = \hat{y}_t(n_{ij}) \frac{1}{|d_{ij}|} + \hat{y}_t(K_{ij})\left(1 - \frac{1}{|d_{ij}|}\right)$$

whereas $\hat{y}_t(e_{ij})$ is the estimated congestion at the edge $e_{ij}$, $\hat{y}_t(n_{ij})$ represents average congestion of $n_i$ and $n_j$, and $\hat{y}_t(K_{ij})$ represents average congestion of the k-nearest neighbors of $n_i$ and $n_j$.

The present invention has the following beneficial effects:

The present invention adopts fuzzy logic to process the traffic situation images on the server side, which can construct the intersection congestion level data set updated in real-time according to the selected area, so as to solve the problem of limited volume and limited area of the network traffic data set. The present invention completes the construction of the deep LSTM neural network that can effectively learn the deep features of traffic data to predict intersection and road congestions, optimizes parameters such as the fine tuning of weights, quantity of hidden layers and neurons with tests results of the real data set and the selected traffic features. Compared with a simple LSTM network for traffic flow prediction, the present invention greatly improves the prediction accuracy under different environmental characteristics.

The FDFP model proposed by the present invention combines the advantages of fuzzy logic in data analysis and those of deep LSTM neural network model in prediction, which can accurately capture data in different weather conditions, such as rain and snow, and peak hours of workdays, providing sufficient prediction performance. The congestion based weighted graph of the city road network is extremely beneficial for minimizing the average travel time of vehicles using proactive rerouting suggestions.

DETAILED DESCRIPTION OF THE PREFERRED EMBODIMENT

Referring to a preferred embodiment, the present invention will be further illustrated as follows.

Preferred Embodiment 1

Figure 1:
FIG. 1 is an image showing congestion levels at intersections after fuzzy logic processing.
Figure 2:
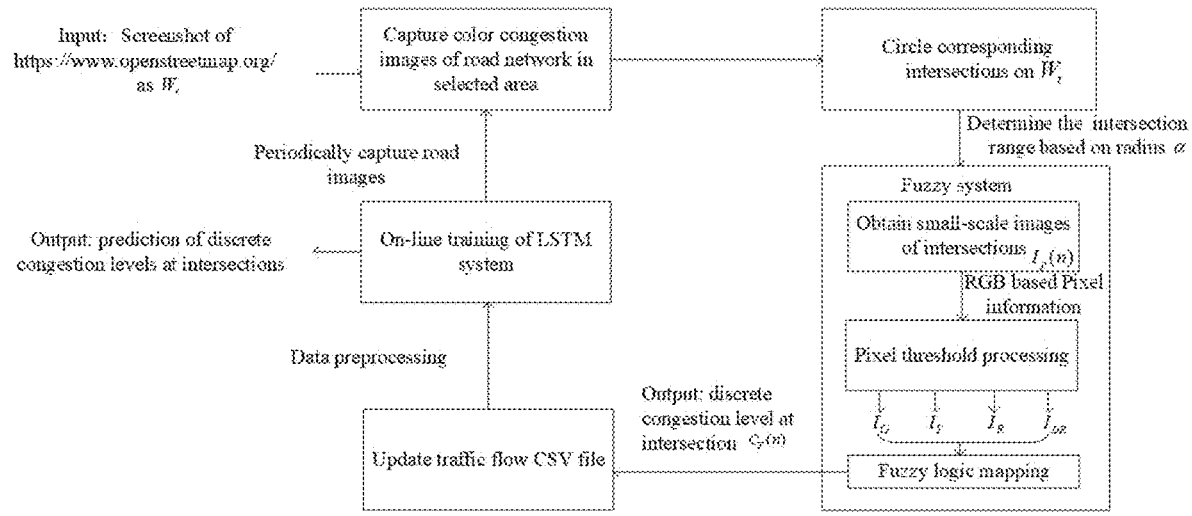
FIG. 2 is a flow chart of FDFP.
Figure 3:
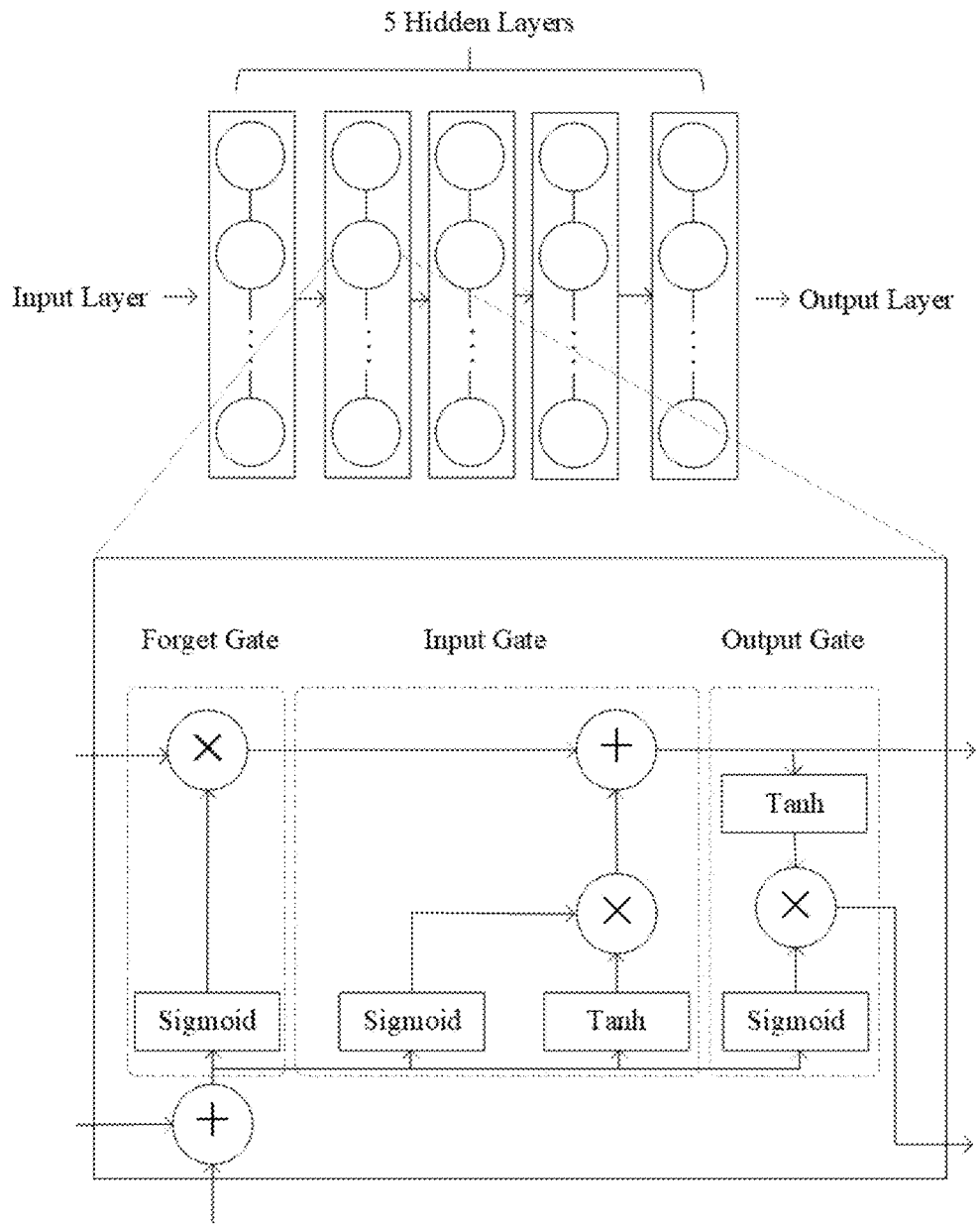
FIG. 3 is a structural view of a deep LSTM network.

Referring to FIGS. 1-3, the present invention provides a large-scale real-time traffic flow prediction method based on fuzzy logic and deep LSTM, comprising steps of:

1) selecting an urban road network scene to collect color images of real-time traffic flow congestion information;
   wherein the step 1) comprises specific steps of:
   1.1) selecting an area, and obtaining dynamic real-time traffic information of the area through map websites comprising Google® Maps, Baidu® Maps, Trafficview® and INRIX®;
   1.2) proposing a recording mechanism for traffic information in the area according to time and space, and constructing a periodically updated data set; and
   1.3) sampling periodically updated traffic information images twice a minute to capture color congestion images $I_T(t)$;

2) obtaining congestion levels of multiple intersections according to the color images, which are used in a data training set; and forming a data sensing end of FDFP through a fuzzy mechanism; wherein in order to extract the congestion information of the intersections that can be used to construct the data set from the images captured in real time on the server side, an information extraction algorithm based on the fuzzy logic is proposed as the data sensing end of the FDFP, which is a training construction data set based on the prediction end of the deep LSTM neural network;
   wherein the step 2) comprises specific steps of:
   2.1) converting a color mode of captured color congestion images from RGB to HSV;
   2.2) according to a mapping relationship from latitude and longitude information of the intersections to image pixel information, adopting a range factor α, which obeys Gaussian distribution, to delimit ranges of the intersections in the images, wherein capture ranges of the intersections are expressed as:

$$I_p(n)=I_T(t)[y_p(n)-\alpha:y_p(n)+\alpha,x_p(n)-\alpha:x_p(n)+\alpha]$$

wherein $I_p(n)$ is a capture range of an n-th intersection, $(x_p(n), y_p(n))$ is coordinate information of the n-th intersection, p is pixels represent that xy coordinate information of the image comes from pixel coordinates of the graphic, and α is the range factor which obeys the Gaussian distribution, which determines a size of a selected intersection area;
   2.3) dividing image information of the intersections into four levels: green, yellow, red, and dark red, thereby representing vehicle speed information on road sections, and indirectly reflecting the congestion levels of the road sections;
   2.4) designing a fuzzy system, and selecting membership function ranges and shapes of each description object, so as to distinguish congestion level dividing results corresponding to the road sections with different colors;
   2.5) using image information of the intersections as an input of the fuzzy system; dividing each input of the fuzzy system into seven linguistic variables to represent congestion levels from non-congestion to severe congestion; and using a fuzzy rule set in combination with a defuzzifier to generate a crisp output;
   2.6) recording obtained congestion level information ranging from 0 to 1 corresponding to each time period and intersection location information in a constructed training data set;
   2.7) obtaining the training data set containing all intersection locations, intersection IDs, congestion information and specific times, wherein the data training set is updated every 30 seconds; and
   2.8) constructing the data training set with traffic congestion information of the selected area for two months to obtain the data sensing end of the FDFP;

3) establishing a deep LSTM neural network, performing deep learning on the training data set, and constructing a prediction end of the FDFP;
   wherein the step 3) comprises specific steps of:
   selecting parameters of each layer of the LSTM neural network; determining a network layer quantity, a neuron quantity in each layer, and an optimization algorithm of a training process; adopting a five-layer LSTM multi-hidden-layer network structure, wherein each layer contains 200 neurons; training an LSTM neural network according to the data training set, and saving an obtained deep LSTM neural network model.
   wherein on the prediction end of the FDFP, the deep LSTM neural network is built to achieve deeper learning of data features; the neural network obtained after training can extract higher-abstracted features from the data to achieve more effective and accurate predictions; and 4) inputting real-time traffic information obtained from a server into an FDFP model to real-time obtain traffic prediction for the multiple intersections within a certain future time range, and evaluating actual real-time traffic conditions of each of the intersections on prediction effects of different models;
   wherein the step 4) comprises specific steps of:
   4.1) inputting periodically updated data into the FDFP model to obtain output prediction data;
   4.2) determining a mean square error of a network training loss function, which is expressed as:

$$MSE(y, \hat{y}) = \frac{1}{T_{samples}} \sum_{t=0}^{T_{samples}-1} (y_t(n) - \hat{y}_t(n))^2$$

wherein $\hat{y}_t(n)$ is actual future time data, $T_{samples}$ is a training window length, and $y_t(n)$ is a model prediction result;
   4.3) selecting actual data set for test according to different parameters, so as to determine parameters for our model, wherein an optimization objective is to minimize a loss function; using an Adam optimization algorithm for gradient calculation, thereby continuously adjusting a model weight and reducing a prediction error of network iterative update; and
   4.4) during prediction, minimizing a mean absolute percentage error MAPE and a mean absolute error MAE to maximize prediction accuracy, wherein the mean absolute percentage error and the mean absolute error are expressed as:

$$MAPE(y, \hat{y}) = \frac{1}{T_{samples}} \sum_{t=0}^{T_{samples}} \frac{|y_t(n) - \hat{y}_t(n)|}{y_t(n)}$$

$$MAE(y, \hat{y}) = \frac{1}{T_{samples}} \sum_{t=0}^{T_{samples}-1} |y_t(n) - \hat{y}_t(n)|$$

wherein $\hat{y}_t(n)$ is actual data at an actual future time t, $T_{samples}$ is the training window length, and $y_t(n)$ is the model prediction result;

5) obtaining the estimated congestion levels at the roads by using a novel discounted averaging formula and generating a weighted graph of city-level road network for optimal travel time route guidance of vehicles.

Preferably, the step 5) comprises specific steps of:

5.1) inputting periodically updated predictions from the LSTM neural network to obtain congestion based graph G(N,E) of the city road network, where N, represents the set of intersections $\{n_i, n_j, \ldots\}$ and E represents set of edges;

5.2) obtaining all Euclidean distances for the graph, and then normalizing them in range (0,1], so that $|d_{ij}|$ is a normalized distance between an intersection $n_i$ and $n_j$ for the edge $e_{ij}$;

5.3) obtaining the estimated congestion of the k-nearest neighbors $K_i$ of every intersection $n_i$ in the graph as:

$$\hat{y}_t(K_i) = \frac{1}{K_i} \sum_{k \in K_i} \hat{y}_t(n_k)$$

5.4) obtaining the estimated congestion of every edge $e_{ij}$ in the graph as:

$$\hat{y}_t(e_{ij}) = \hat{y}_t(n_{ij}) \frac{1}{|d_{ij}|} + \hat{y}_t(K_{ij}) \left(1 - \frac{1}{|d_{ij}|}\right)$$

whereas $\hat{y}_t(e_{ij})$ is the estimated congestion at the edge $e_{ij}$, $\hat{y}_t(n_{ij})$ represents the average congestion of $n_i$ and $n_j$, and $(K_{ij})$ represents the average congestion of their k-nearest neighbors.

The above is only a preferred embodiment of the large-scale real-time traffic flow prediction method based on the fuzzy logic and the deep LSTM. The protection scope of the present invention is not limited to the above preferred embodiment, and all technical solutions under the above concept should fall into the protection scope of the present invention. For those skilled in the art, several improvements and modifications can be made without departing from the principle of the present invention, and such improvements and modifications should also fall into the protection scope of the present invention.

What is claimed is:

1. A large-scale real-time traffic flow prediction method based on fuzzy logic and deep LSTM (long short-term memory) neural network, comprising steps of:
   1) selecting an urban road network scene to collect color images of real-time traffic flow congestion information;
   2) obtaining congestion levels of multiple intersections used in a data training set according to the color images; and forming a data sensing end of an FDFP (Fuzzy logic and Deep learning based Flow Prediction) model through a fuzzy mechanism;
   3) establishing a deep LSTM neural network, performing deep learning on the data training set, and constructing a prediction end of the FDFP model;
   4) inputting real-time traffic information obtained from a server into the FDFP model to real-time obtain traffic prediction for the multiple intersections within a certain future time range, and evaluating actual real-time traffic conditions of each of the intersections on prediction effects of different models;
   5) inputting periodically updated predictions from the LSTM neural network to obtain congestion based graph G(N,E) of the urban road network, wherein N represents the set of intersections $\{n_i, n_j, \ldots\}$ and E represents set of edges;
   6) obtaining all Euclidean distances for the graph G(N, E), and then normalizing the Euclidean distances in range (0,1], so that $|d_{ij}|$ is a normalized distance between an intersection $n_i$ and $n_j$ for an edge $e_{ij}$;
   7) obtaining estimated congestion of k-nearest neighbors $K_i$ of every intersection $n_i$ in the graph G(N, E) as:

$$\hat{y}_t(K_i) = \frac{1}{K_i} \sum_{k \in K_i} \hat{y}_t(n_k);$$

and
   8) obtaining estimated congestion of every edge $e_{ij}$ in the graph as:

$$\hat{y}_t(e_{ij}) = \hat{y}_t(n_{ij}) \frac{1}{|d_{ij}|} + \hat{y}_t(K_{ij}) \left(1 - \frac{1}{|d_{ij}|}\right)$$

wherein $\hat{y}_t(e_{ij})$ is the estimated congestion at the edge $e_{ij}$, $\hat{y}_t(n_{ij})$ represents the average congestion of $n_i$ and $n_j$, and $\hat{y}_t(K_{ij})$ represents average congestion of the k-nearest neighbors of $n_i$ and $n_j$.

2. The large-scale real-time traffic flow prediction method, as recited in claim 1, wherein the step 1) comprises specific steps of:
   1.1) selecting an area, and obtaining dynamic real-time traffic information of the area through map websites comprising Google® Maps, Baidu® Maps, Trafficview® and INRIX®;
   1.2) proposing a recording mechanism for traffic information in the area according to time and space, and constructing a periodically updated data set; and
   1.3) sampling periodically updated traffic information images twice a minute to capture color congestion images $I_T(t)$.

3. The large-scale real-time traffic flow prediction method, as recited in claim 1, wherein the step 2) comprises specific steps of:
   2.1) converting a color mode of captured color congestion images from RGB to HSV;
   2.2) according to a mapping relationship from latitude and longitude information of the intersections to image pixel information, adopting a range factor $\alpha$, which obeys Gaussian distribution, to delimit ranges of the intersections in the images, wherein a capture range $I_p(n)$ ranges from $x_p(n)-\alpha$ to $x_p(n)+\alpha$ in an x-axis direction, and from $y_p(n)-\alpha$ to $y_p(n)+\alpha$ in a y-axis direction;
   wherein $I_p(n)$ is the capture range of an n-th intersection, $(x_p(n), y_p(n))$ is coordinate information of the n-th intersection, p is pixel information, and $\alpha$ is the range factor which obeys the Gaussian distribution;
   2.3) dividing image information of the intersections into four levels: green, yellow, red, and dark red, thereby representing vehicle speed information on road sections, and indirectly reflecting the congestion levels of the road sections;
   2.4) designing a fuzzy system, and selecting membership function ranges and shapes of each description object, so as to distinguish congestion level dividing results corresponding to the road sections with different colors;

2.5) using pixel levels $I_G$, $I_Y$, $I_R$, $I_{DR}$, which correspond to the four colors in each intersection image after threshold processing, as an input of the fuzzy system; dividing each input of the fuzzy system into seven linguistic variables to represent the congestion levels from non-congestion to severe congestion; and using a fuzzy rule set in combination with a defuzzifier to generate a crisp output;

2.6) recording obtained congestion level information ranging from 0 to 1 corresponding to each time period and intersection location information in a constructed training set;

2.7) obtaining the training data set containing all intersection locations, intersection IDs, congestion information and specific times, wherein the data training set is updated every 30 seconds; and 2.8) constructing the data training set with traffic congestion information of the selected area for two months to obtain the data sensing end of the FDFP model.

4. The large-scale real-time traffic flow prediction method, as recited in claim 1, wherein the step 3) comprises specific steps of:

selecting parameters of each layer of the LSTM neural network; determining a network layer quantity, a neuron quantity in each layer, and an optimization algorithm of a training process; adopting a five-layer LSTM multi-hidden-layer network structure, wherein each layer contains 200 neurons; training an LSTM neural network according to the data training set, and saving an obtained deep LSTM neural network model.

5. The large-scale real-time traffic flow prediction method, as recited in claim 1, wherein the step 4) comprises specific steps of:

4.1) inputting periodically updated data into the FDFP model to obtain output prediction data;

4.2) determining a mean square error of a network training loss function, which is expressed as:

$$MSE(y, \hat{y}) = \frac{1}{T_{samples}} \sum_{t=0}^{T_{samples}-1} (y_t(n) - \hat{y}_t(n))^2$$

wherein $\hat{y}_t(n)$ is actual future time data, $T_{samples}$ is a training window length, and $y_t(n)$ is a model prediction result;

4.3) selecting actual data set for test according to different parameters, so as to determine parameters for the FDFP model, wherein an optimization objective is to minimize a loss function; using an Adam optimization algorithm for gradient calculation, thereby continuously adjusting a model weight and reducing a prediction error of network iterative update; and 4.4) during prediction, minimizing a mean absolute percentage error MAPE and a mean absolute error MAE to maximize prediction accuracy, wherein the mean absolute percentage error and the mean absolute error are expressed as:

$$MAPE(y, \hat{y}) = \frac{1}{T_{samples}} \sum_{t=0}^{T_{samples}} \frac{|y_t(n) - \hat{y}_t(n)|}{y_t(n)}$$

$$MAE(y, \hat{y}) = \frac{1}{T_{samples}} \sum_{t=0}^{T_{samples}-1} |y_t(n) - \hat{y}_t(n)|$$

wherein $\hat{y}_t(n)$ is actual data at an actual future time t, $T_{samples}$ is the training window length, and $y_t(n)$ is the model prediction result.

\* \* \* \* \*